Dec. 25, 1934.  B. M. SHORT ET AL  1,985,429
TIRE COVER
Filed Sept. 22, 1930  2 Sheets-Sheet 1
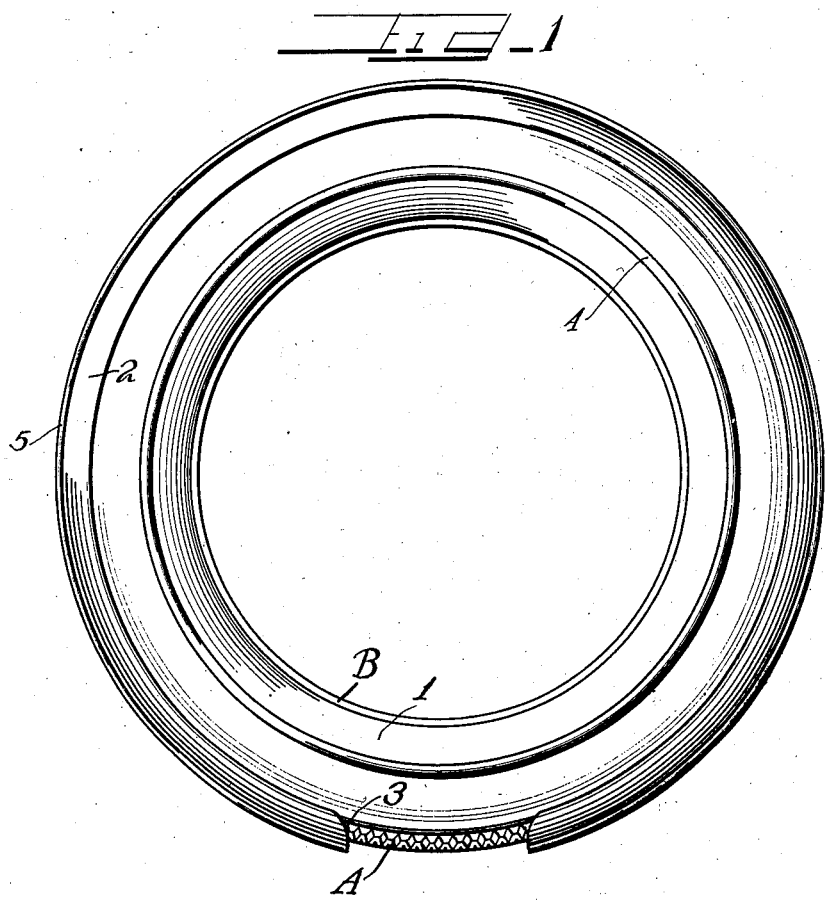
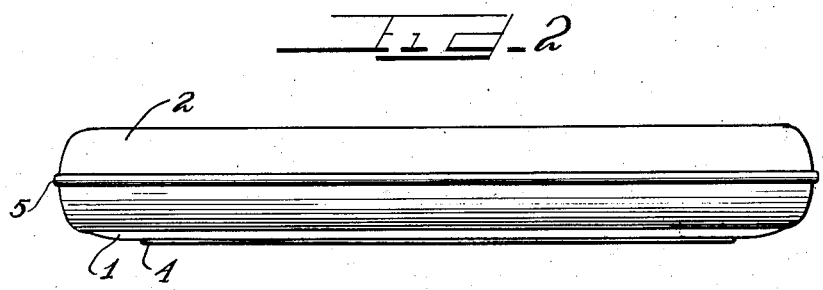
Inventors
Bladen M. Short
Herbert S. Jandus
by Charles Orwell  Attys

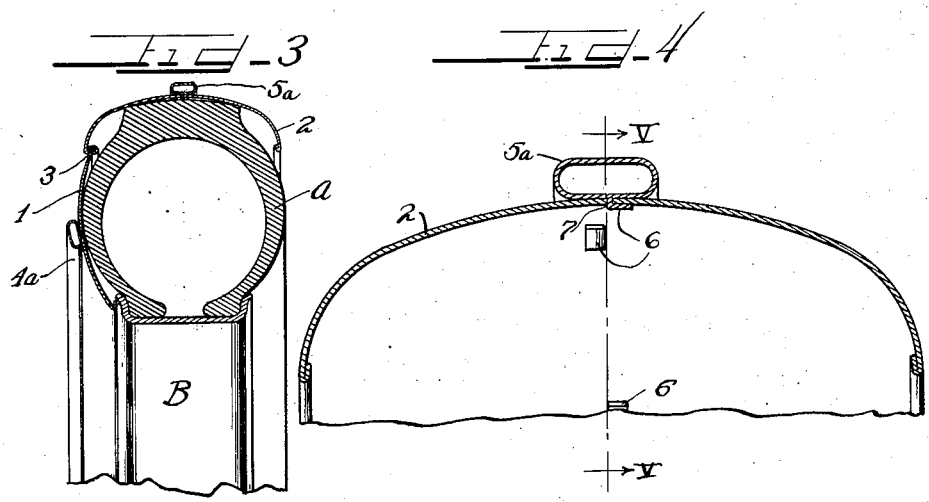
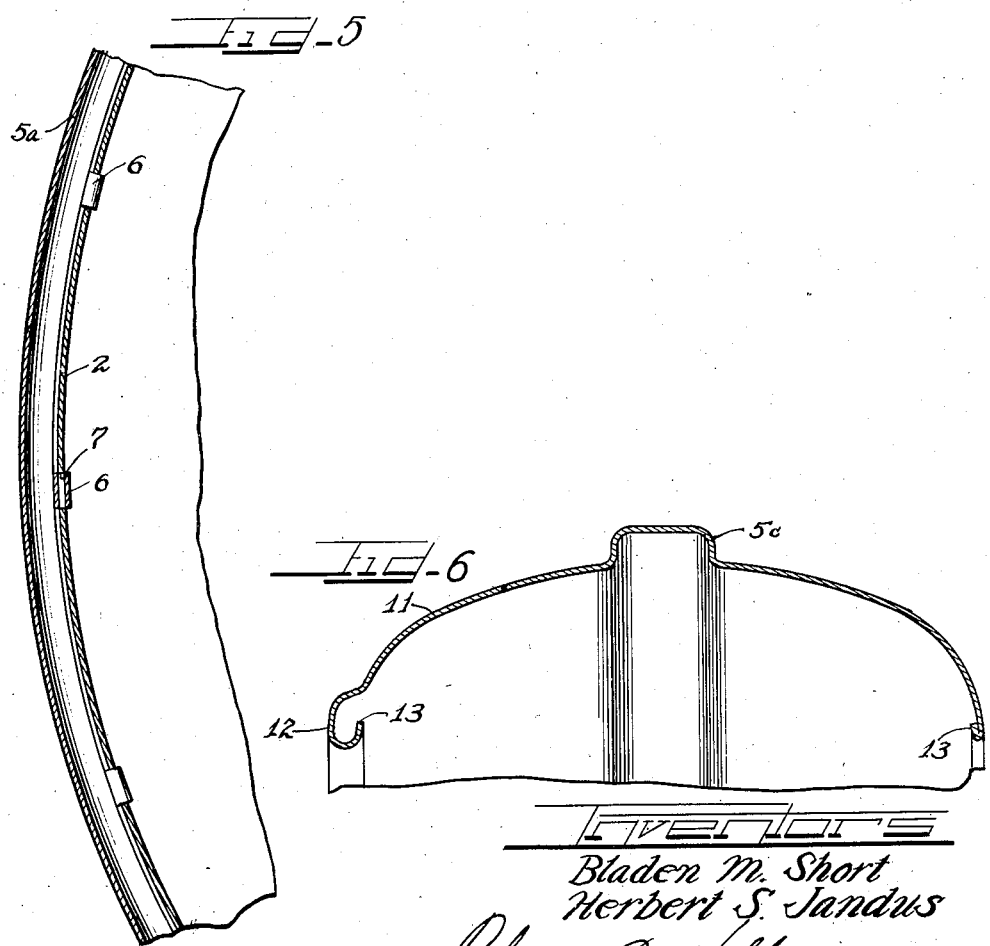

Patented Dec. 25, 1934

1,985,429

UNITED STATES PATENT OFFICE 1,985,429

TIRE COVER

Bladen M. Short and Herbert S. Jandus, Detroit, Mich., assignors to Lyon Cover Company, Detroit, Mich., a corporation of Michigan Application September 22, 1930, Serial No. 483,524

6 Claims. (Cl. 150—54)

This invention relates to tire covers.

One of the essential objects of this invention is to provide, in connection with that form of tire cover now more or less in general use and employing a side plate of annular form adapted to engage the side wall of a tire and a split spring ring adapted for engagement with the tread of the tire and also with the outer rim of the side plate to hold both the side plate and itself by resilience tightly on the tire, stiffening means to resist flexing or deformation of the cover members.

In carrying out our invention into practice, we provide the side plate and outer ring with molding or beading which may be centrally located on said members or may be disposed along the rims thereof, the beading or molding being securely fastened in place. The members of the cover, especially the outer ring, are made of spring metal, and it is highly desirable that the metal be as thin as possible for the sake of lightness and low cost of manufacture. Thus with thin metal combined with our stiffening means, it is possible to attain a rigidity which would not be possible in the absence of some form of stiffening means, unless a metal of substantially greater thickness were used.

Another object of the invention resides in the provision of a beading or molding to the parts of this form of tire cover in order to enhance the beauty of the same.

A further object of the invention resides in employing novel means for attaching a stiffening means to a tire cover member.

Other and further important objects and advantages of this invention will be apparent from the disclosure in the specification and the accompanying drawings.

This invention (in a preferred form) is illustrated in the drawings and hereinafter more fully described.

On the drawings:

Figure 1 is an elevational view showing our improved tire cover applied to a tire.

Figure 2 is a top plan view of the same.

Figure 3 is a transverse sectional view of a tire and a tire cover embodying our invention mounted thereon, illustrating one form of beading or molding applied to the tire cover member.

Figure 4 is an enlarged sectional view of the tread engaging cover member shown in Figure 3, illustrating in greater detail the manner of attachment of the beading or molding to the outer cover member or ring.

Figure 5 is a sectional view taken approximately in the plane indicated by the line V—V of Figure 4.

Figure 6 is a view similar to Figure 4, but showing a modified form of the invention.

Referring now more particularly to the drawings, wherein the same reference characters indicate identical parts, the tire A provided with a rim B is shown as having mounted thereon a tire cover of the character contemplated by our invention and comprising a metallic side plate 1 adapted for engagement with the side wall of the tire as shown, and a resilient metallic split ring member 2 engaging the tread of the tire A and also the rubber bead 3 which is secured to the outer rim of the side plate 1. The resilience of the ring member 2 serves not only to maintain itself, but the side plate 1 as well, in tight contact with the tire A.

For the purpose of stiffening the members 1 and 2, a bead or molding 4 is applied to the member 1 intermediate its inner and outer peripheries, and a bead 5 is likewise applied to the outer ring member 2 intermediate the longitudinal edges thereof. If desired, the beads may be located along one or both edges of the members 1 and 2, and it is to be appreciated that the showing in Figures 1 and 2 of the centrally located bead or molding is for the purpose of illustration only.

One form of our invention is shown in Figures 3, 4 and 5, wherein the molding 4a and 5a is in the form of a sheet metal element bent into the shape of a flat oval with its edges disposed adjacent the cover member to which it is to be attached, said edges being provided with staggered tongues 6 projecting through holes 7, alined or otherwise, in the cover members and bent back upon themselves into engagement with the interior of said members, as clearly shown in Figure 4.

In Figure 6 is shown a further modification of the invention, wherein the bead or molding is formed integral with the cover members. While only the resilient outer ring member 11 is here illustrated, it is to be understood that the form of the invention employed in connection with this ring member may also be availed of in connection with the side plate indicated at 1 in the other figures of the drawings. In this modification, the molding 5c and 12 is integral with the member 11. The molding 5c is extruded and may be located preferably intermediate the longitudinal edges 13 of the member 11. The metal along one edge of the member 11 is turned upon itself to form the molding 12, the edge 13 being disposed interiorly of the member 11 to be invisible when the cover is mounted on the tire.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A tire cover including a resilient metallic split ring adapted to tightly grip a major portion of the outer periphery of a tire, and stiffening means therefor, said ring having an opening and said means having a tongue projecting through said opening and engaging the face of the ring opposite that on which said means is disposed, whereby said ring and means are interlocked.

2. A tire cover including a resilient metallic split ring adapted to tightly grip a major portion of the outer periphery of a tire, and stiffening means therefor, said ring and said means having cooperating openings and tongues projecting through said openings, whereby said ring and means are interlocked.

3. A tire cover including a resilient metallic split ring member for embracing a major portion of the outer periphery of a tire and having a transverse dimension substantially commensurate with the transverse dimension of the tread of the tire for covering the latter, and stiffening means for imparting to said member the resilient characteristics of a member of relatively thick sheet metal, said ring member and means having cooperating openings and tongues projecting through said openings, whereby said member and means are interlocked.

4. A tire cover including a flexible split ring for embracing a major portion of the outer periphery of a tire, and resilient means for stiffening said ring to yieldably resist expansion thereof, said ring having an opening and said means having a tongue projecting through said opening and engaging the face of the ring opposite to that on which said means is disposed, whereby said ring and means are interlocked.

5. A tire cover including a flexible split ring for embracing a major portion of the outer periphery of a tire, and resilient stiffening means therefor, said ring and said means having cooperating openings and tongues projecting through said openings, whereby said ring and means are interlocked.

6. A tire cover comprising a flexible split ring for embracing the major portion of the outer periphery of a tire, and a resilient bead for stiffening said ring to yieldably resist expansion thereof, said bead being substantially coextensive with said ring, said ring and said bead having cooperating openings, and tongues projecting through said openings, whereby said ring and bead are interlocked.

BLADEN M. SHORT.
HERBERT S. JANDUS.